(12) United States Patent
Klein et al.

(10) Patent No.: US 10,485,061 B2
(45) Date of Patent: Nov. 19, 2019

(54) HEATABLE LAMINATED SIDE PANE

(71) Applicant: SAINT-GOBAIN GLASS FRANCE, Courbevoie (FR)

(72) Inventors: Marcel Klein, Baesweiler (DE); Francois Hermange, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 784 days.

(21) Appl. No.: 14/908,480

(22) PCT Filed: May 20, 2014

(86) PCT No.: PCT/EP2014/060314
§ 371 (c)(1),
(2) Date: Jan. 28, 2016

(87) PCT Pub. No.: WO2015/014511
PCT Pub. Date: Feb. 5, 2015

(65) Prior Publication Data
US 2016/0174295 A1     Jun. 16, 2016

(30) Foreign Application Priority Data

Jul. 31, 2013   (EP) .................................. 13178680

(51) Int. Cl.
    *B60L 1/02*            (2006.01)
    *H05B 3/86*           (2006.01)
    (Continued)

(52) U.S. Cl.
    CPC ......... *H05B 3/86* (2013.01); *B32B 17/10036* (2013.01); *B32B 17/10183* (2013.01);
    (Continued)

(58) Field of Classification Search
    CPC ........ H05B 3/86; H05B 3/84; B32B 17/10761
    (Continued)

(56) References Cited

U.S. PATENT DOCUMENTS

| | | | | |
|---|---|---|---|---|
| 2,878,357 A | * | 3/1959 | Thomson | .......... B32B 17/10036 219/203 |
| 8,022,334 B2 | * | 9/2011 | Baumler | .................. H05B 3/84 219/203 |
| 2013/0092676 A1 | * | 4/2013 | Offermann | ........ B32B 17/10036 219/203 |

FOREIGN PATENT DOCUMENTS

| | | |
|---|---|---|
| DE | 102004029164 A1 | 12/2005 |
| WO | 03/105532 A1 | 12/2003 |

(Continued)

OTHER PUBLICATIONS

Written Opinion for International Application No. PCT/EP2014/060314 filed on May 20, 2014 in the name of Saint-Gobain Glass France, dated Jul. 29, 2014 (English translation & German original).

(Continued)

*Primary Examiner* — Tu B Hoang
*Assistant Examiner* — Thomas J Ward
(74) *Attorney, Agent, or Firm* — Pillsbury Winthrop Shaw Pittman LLP

(57) ABSTRACT

A heatable laminated side pane is described. The heatable laminated side pane comprises at least an outer pane and an inner pane, which are connected to each other via a thermoplastic intermediate layer. An electrically conductive coating is arranged on the surface between the outer pane and the inner pane. The electrically conductive coating is divided into segments by isolation lines, wherein the coating has heating strips extending between a first current collector rail and a second current collector rail. Each collector rail contains at least one segment, wherein the heating strips are electrically isolated from each other. At least one heating strip is formed by at least two segments, which are electrically connected to each other via at least one electrically conductive connector element, and the length of each indi- (Continued)

Figure 1:
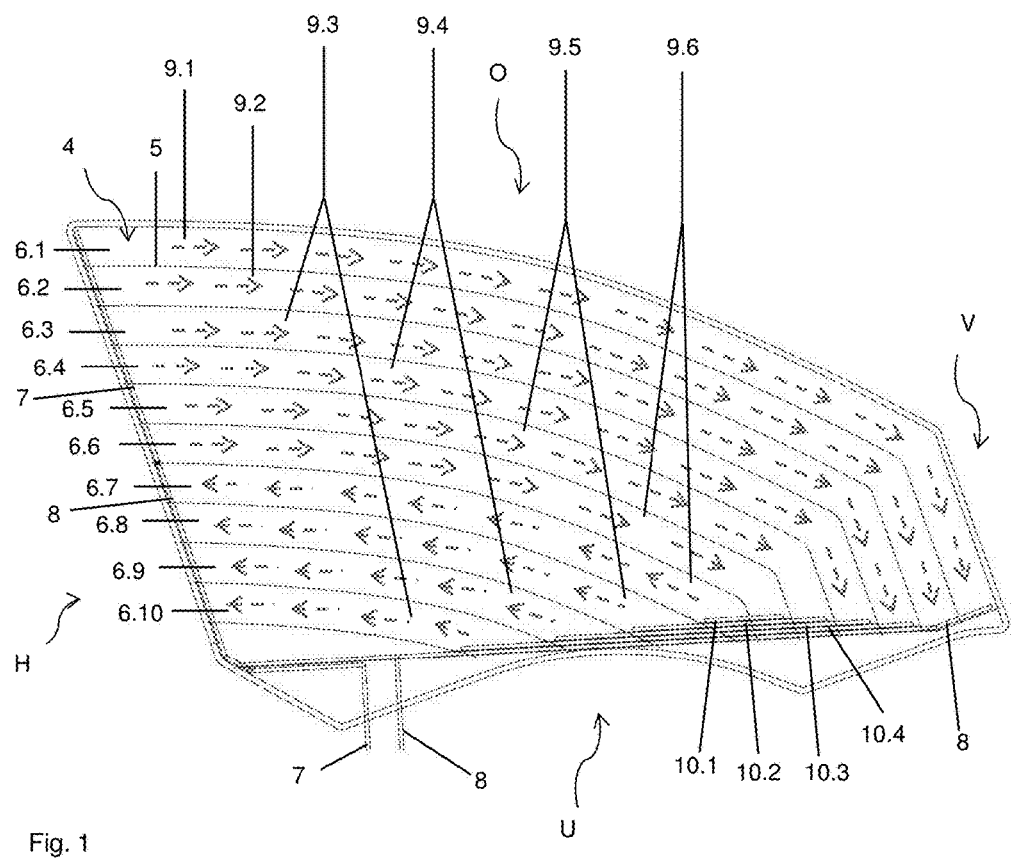

vidual heating strip deviates by a maximum of 15% from the average length of the heating strips.

26 Claims, 6 Drawing Sheets

(51) Int. Cl.
    *B32B 17/10* (2006.01)
    *H05B 3/36* (2006.01)
    *H05B 3/84* (2006.01)

(52) U.S. Cl.
    CPC .. *B32B 17/10192* (2013.01); *B32B 17/10229* (2013.01); *B32B 17/10761* (2013.01); *H05B 3/36* (2013.01); *H05B 3/84* (2013.01); *H05B 2203/005* (2013.01); *H05B 2203/011* (2013.01); *H05B 2203/013* (2013.01); *H05B 2203/017* (2013.01)

(58) Field of Classification Search
    USPC .................. 219/203, 553; 343/703, 704, 711
    See application file for complete search history.

(56) References Cited

FOREIGN PATENT DOCUMENTS

| WO | 03/105533 A1 | 12/2003 |
|---|---|---|
| WO | 2006/010698 A1 | 2/2006 |
| WO | 2007/039747 A1 | 4/2007 |
| WO | 2010/049431 A2 | 5/2010 |

OTHER PUBLICATIONS

International Search Report for International Application No. PCT/EP2014/060314 filed on May 20, 2014 in the name of Saint-Gobain Glass France, dated Jul. 29, 2014 (English translation & German original).

* cited by examiner

HEATABLE LAMINATED SIDE PANE

CROSS REFERENCE TO RELATED APPLICATIONS

The present application is the US national stage entry of International Patent Application No. PCT/EP2014/060314 filed internationally on May 20, 2014, which claims priority to European Patent Application No. 13178680.8 filed on Jul. 31, 2013.

The invention relates to a heatable laminated side pane, a method for its production, and its use.

Window panes in the automotive sector that are heatable by means of a transparent, electrically conductive coating are well known to the person skilled in the art. The coatings include electrically conductive layers, based, in particular, on silver. The coatings are customarily electrically contacted with two current collection rails (also referred to as collection conductors or busbars), between which a current flows through the heatable coating. This type of heating has been described in particular for windshields where the busbars can be arranged parallel to each other on the upper and lower edges. A homogeneous heating field is formed between the parallel busbars.

Heating by means of conductive coatings is also of interest for side panes. Due to their complex shape, it is, however, impossible to arrange the busbars parallel to each other such that a homogeneous heating field is formed in the vision zone of the pane. Moreover, it is, in particular in the case of panes for side windows that can be opened by vertical movement of the pane, desirable for the busbars to be concealed by vehicle body parts even in the opened state, which additionally entails limitations with regard to the positioning of the busbars.

In order to guide the current paths between the busbars over the vision zone of the pane, it is customary to pattern the coating by means of line-shaped, de-coated regions. Side panes with a patterned conductive coating are known, for example, from DE 10 2004 029 164 A1, WO 03/105532 A1, WO 03/105533 A1, and WO 2006010698 A1. However, as a result of the fact that the different current paths between the busbars are very different due to the proposed designs of patterning, zones with very different temperature and, consequently, heating action are formed. In addition, the de-coated lines frequently result in local overheating, so-called "hotspots", at locations where the direction of the current paths changes greatly, in particular corners or open ends of lines.

The object of the present invention is to provide an improved heatable side pane with homogeneous heating action.

The object of the present invention is accomplished by a heatable laminated side pane in accordance with claim 1. Preferred embodiments emerge from the subclaims.

The heatable laminated side pane according to the invention comprises at least an outer pane and an inner pane, which are connected to each other via a thermoplastic intermediate layer, and an electrically conductive coating arranged in a planar manner between the outer pane and the inner pane, which coating is divided into segments by isolation lines, wherein
the coating has heating strips running between a first busbar and a second busbar and each containing at least one segment, which heating strips are electrically isolated from each other,
at least one heating strip is formed by at least two segments, which are electrically conductively connected to each other via at least one electrically conductive connection element.

The length of each individual heating strip preferably deviates by at most 15% from the average length of the heating strips.

The laminated side pane according to the invention is the side pane of a vehicle, preferably a motor vehicle, for example, a passenger car or a truck. The laminated side pane comprises an inner pane and an outer pane. The term "inner pane" refers to that pane that is turned toward the interior of the vehicle in the installed position. The term "outer pane" refers to that pane that is turned toward the external environment in the installed position. According to the invention, an electrically conductive coating is arranged between the outer pane and the inner pane. The heating layer is connected to a first and a second busbar. The busbars are provided to be connected to an external power source such that a current flows through the conductive coating between the busbars. The coating thus acts as a heating layer and heats the side pane as a result of its electrical resistance, for example, in order to de-ice the side pane or to free it from moisture condensation. The heating layer can be applied to a surface of the inner pane or of the outer pane or to a film of the intermediate layer.

The electrically conductive coating is divided by the isolation lines into different segments separated from each other. These segments make it possible to selectively form the path of the flow of current between the first busbar and the second busbar, which is necessary due to the complex shapes of customary side panes to ensure homogeneous current distribution and, consequently, heating action.

The invention is based on the knowledge that for homogenization of the heating action, is not the resistance of the heating strips (indicated by the unit ohm) that is involved, but rather the surface power density (indicated by the unit W/m²) or the surface current density (indicated by the unit A/m²).

The resistance R (in the unit Ω) of a heating strip follows from $$R = \frac{\rho \cdot L}{d \cdot B}, \qquad (1)$$

where ρ represents the specific electrical resistance (unit Ωm), L represents the length of the heating strip (unit m), d represents the thickness of the heating strip, i.e., the thickness of the electrically conductive coating (unit m), and B represents the width of the heating strip (unit m).

If the temperature of the heating strips were directly dependent on the value of the resistance, it could be influenced according to formula (1) with a given heatable coating on the one hand by the length L and on the other by the width B of the heating strip. Instead, the inventors surprisingly ascertained that the temperature can be influenced by the selection of the length L alone, whereas the width B is immaterial. The reason for this is that the temperature of the heating strip depends on the surface power density $P_S$.

The surface power density is the power P divided by the area (surface) S of the heating strip, i.e.

$$P_S = \frac{P}{S} = \frac{U \cdot I}{S}, \qquad (2)$$

where U represents the voltage (unit W) and I represents the amperage (unit A), and the known relationship P=UI was used. Using Ohm's law (U=RI) and formula (1), it follows $$P_S = \frac{U^2}{S \cdot R} = \frac{U^2 \cdot d \cdot B}{S \cdot \rho \cdot L}. \quad (3)$$

Since the area S is the product of width B and length L of the heating strip (S=B L), it follows $$P_S = \frac{U^2 \cdot d \cdot B}{B \cdot L \cdot \rho \cdot L} = \frac{U^2 \cdot d}{\rho \cdot L^2}. \quad (4)$$

The surface power density $P_S$ is thus independent of the width B of the heating strip, but with a given voltage U, layer thickness d, and specific resistance ρ, dependent only on the length L of the heating strip. The inventors have now discovered that the temperature of the heating strips is influenced by the surface power density $P_S$ and thus, with a given heatable coating and the voltage (customarily specified in the automotive sector), only by the length L.

In the case of a simple rectangular pane, in which the busbars are arranged parallel to each other on two opposite side edges, current paths of equal length are present, yielding homogeneous heating power. In the case of side panes, the homogeneous heating power presents a great challenge due to the complex shape of the pane, deviating greatly from a rectangle. According to the invention, the heatable coating is divided into segments by isolation lines in order to guide the current in a distributed manner over the entire pane from the first to the second busbar and thus to obtain heating action on the entire pane. However, segments of different lengths result. In order to nevertheless obtain current paths with equal (or similar) length, multiple segments are connected via electrical connection elements to form heating strips. According to the invention, the segments are designed and connected to each other such that the length of each individual heating strip deviates by at most 15% from the average length of the heating strips, i.e., that all heating strips have a similar length.

Here, "the average length" of the heating strips means the arithmetic mean of the heating strip lengths, i.e., the sum of the lengths of all heating strips divided by the number of heating strips.

The length of each individual heating strip preferably deviates by at most 10%, particularly preferably by at most 5% from the average length of the heating strips. This is particularly advantageous with regard to homogeneous heating action.

The length of a heating strip is measured in the center of the heating strip. This means that the distance measured is arranged in the center of the heating strip, with the lateral distance from the two isolating lines that delimit the heating strip being equal.

It is also possible to apply the principle of similarly long heating strips that result in homogeneous heating power to only one region of the pane. This is of interest when one region of the pane is to be provided with higher or lower heating power than the rest of the pane. Then, this region can be excluded from the pattern of the heating strips according to the invention. For example, it can be desirable for a side pane to have, in the forward region, a clearly higher heating power than in the remaining region, so that the driver's view of the side mirror is cleared as quickly and efficiently as possible. Then, the majority of the pane area can be provided with the heating strips designed according to the invention, whereas in the forward region, a higher heating power is deliberately obtained through appropriate configuration of the segments and the heating strips.

The segments are preferably implemented strip-shaped. Here, the term "a strip" means a shape whose length is at least twice the size of its width. In the context of the invention, the width is that dimension along which the segments are connected to the busbar. The length is that dimension along which the current path extends.

As stated above, the width of the segments and, thus, of the heating strips has no effect on the temperature distribution on the pane. However, the isolation lines can have an effect on the appearance of the pane. For aesthetic reasons, inconspicuous isolation lines are desirable, which results in a harmonious and non-disruptive appearance. Consequently, all segments preferably have the same width. The isolation lines are then advantageously distributed uniformly and inconspicuously over the pane. On the one hand, the pane should not have too many isolation lines, because, as a result, the appearance is disrupted. In addition, many isolation lines and correspondingly many segments make a large number of connection elements necessary, which, beyond a certain number, can only be hidden from the observer with difficulty. On the other hand, the pane should also not have too few isolation lines in order to enable the interconnection of the segments to form heating strips of the same length. The exact number and width of the segments depends in the individual case on the precise shape of the pane and can be determined by the person skilled in the art through preliminary considerations and simulations. The width of the segments also depends on the size of the side pane. Customarily, with side panes for passenger vehicles, particularly good results are obtained when the width of the segments is from 1 cm to 10 cm, preferably from 2 cm to 6 cm. For larger side panes, for example, of trucks, significantly larger widths can, however, be selected, for example, from 5 cm to 30 cm. The number of the segments is in principle greater than or equal to 3 and is preferably from 5 to 15.

The number of heating strips is, in principle, greater than or equal to 2 and is preferably from 3 to 10, particularly preferably from 4 to 7. This is particularly advantageous with regard to homogeneous heating power, a visually attractive pane, and simple production.

All heating strips can be formed by segments serially connected to each other. However, heating strips that include only a single segment can also be present. Each group of segments connected to each other that form a heating strip preferably consists of two segments that are serially connected via an electrically conductive connection element. Each heating strip is then formed by one or two segments. This is advantageous with regard to simple production of the pane. However, the groups can, in principle, also consist of more than two segments, for example, of three segments that are serially connected via two electrically conductive connection elements, or four segments that are serially connected via three electrically conductive connection elements.

The electrically conductive coating is, according to the invention, arranged in a planar manner between the outer pane and the inner pane. The electrically conductive coating can be applied on the surface of the outer pane or of the inner pane facing the intermediate layer. The electrically conductive coating can also be applied on a layer of the intermediate layer, for example, on a carrier film.

The electrically conductive coating is preferably transparent. In the context of the invention, this includes a coating that has light transmittance greater than 70% in the spectral range from 500 nm to 700 nm. This is, thus, a coating that is intended and suited to be applied substantially covering the entire surface of the pane, while retaining visibility through it. The transparent electrically conductive coating is, in particular, not a structure made of opaque heating conductors, for example, formed from printed-on silver paste, which disrupts visibility through the pane and where visibility must occur between the heating conductors.

The electrically conductive coating has at least one electrically conductive layer. The coating can have, in addition, dielectric layers, which serve, for example, for sheet resistance regulation, for corrosion protection, or for reflection reduction. The conductive layer preferably contains silver or an electrically conductive oxide (transparent conductive oxide, TCO) such as indium tin oxide (ITO). The conductive layer preferably has a thickness from 10 nm to 200 nm. To improve conductivity with high transparency at the same time, the coating can have multiple electrically conductive layers that are separated from each other by at least one dielectric layer. The conductive coating can, for example, include two, three, or four electrically conductive layers. Typical dielectric layers contain oxides or nitrides, for example, silicon nitride, silicon oxide, aluminum nitride, aluminum oxide, zinc oxide, or titanium oxide.

In a particularly preferable embodiment, the electrically conductive coating has at least one electrically conductive layer, which contains silver, preferably at least 99% silver. The layer thickness of the electrically conductive layer is preferably from 5 nm to 50 nm, particularly preferably from 10 nm to 30 nm. The coating preferably has two or three of these conductive layers, which are separated from each other by at least one dielectric layer. Such coatings are particularly advantageous with regard to the transparency of the pane, for one thing, and to its conductivity, for another.

The electrically conductive coating can have the same area as the pane and extend all the way to the side edges of the composite glass. The electrically conductive coating can, however, also have a smaller area than the composite glass such that a circumferential edge region with a width of preferably 0.5 mm to 10 mm is not provided with the coating. The conductive coating is thus protected within the intermediate layer against contact with the surrounding atmosphere, which is advantageous with regard to preventing corrosion. The pane can also include other uncoated regions, for example, data transmission windows or communication windows.

The side pane according to the invention is, in an advantageous embodiment, a side pane of the side window that can be opened. The opening of the side window is done by vertical movement of the side pane into the vehicle door. When the side pane is in the open state, the forward edge (that edge that faces forward in the driving direction) and the upper edge of the side pane are usually visible, whereas the rear edge (that edge that faces the rear in the driving direction) and the lower edge are concealed by the vehicle body. Consequently, busbars and connection elements along the rear edge or the lower edge of the pane can advantageously be hidden behind parts of the vehicle body, even when the side pane is in the open state. In a preferred embodiment, the busbars and all electrically conductive connection elements are, for this reason, arranged along the rear edge or the lower edge. This means that the lengthwise direction of the busbar or the connection elements is oriented or aligned virtually on the respective side edge, in particular, arranged parallel to the side edge, and that the busbars and the connection element are arranged near the respective side edge. The distance between the busbars and connection elements and, optionally, the lower edge, if they extend along the lower edge, is less than 10 cm, preferably less than 5 cm. In the region of the rear edge, usually a clearly smaller region that is covered by body elements is available. The distance between the busbars and connection elements and, optionally, the rear edge, if they extend along the rear edge, is less than 3 cm, preferably less than 1.5 cm.

In a preferred embodiment of the invention, the heating power (surface power density $P_S$) of the heatable coating is at least 250 W/m², particularly preferably at least 300 W/m², most particularly preferably at least 350 W/m². Thus, an advantageous heating action is obtained.

The sheet resistance of the electrically conductive coating is preferably from 0.5 ohm/square to 5 ohm/square. Thus, with voltages customarily used in the automotive sector, advantageous heating powers are obtained, with lower sheet resistances resulting in higher heating powers when the same voltage is applied.

The busbars are, in one embodiment of the invention, implemented as printed and fired conductive structures. The printed busbars contain at least one metal, preferably silver. The electrical conductivity is realized preferably via metal particles contained in the busbar, particularly via silver particles. The metal particles can be situated in an organic and/or inorganic matrix such as pastes or inks, preferably as fired screen printing paste with glass frits. The layer thickness of the printed busbars is preferably from 5 μm to 40 μm, particularly preferably from 8 μm to 20 μm, and most particularly preferably from 10 μm to 15 μm. Printed busbars with these thicknesses are technically simple to realize and have an advantageous current load capacity. Printed busbars are particularly suitable when the electrically conductive coating is applied to a surface of the outer pane or of the inner pane.

The busbars can be, in another embodiment of the invention, implemented as strips of an electrically conductive foil. The busbars then contain, for example, at least aluminum, copper, tinned copper, gold, silver, zinc, tungsten, and/or tin or alloys thereof. The strip preferably has a thickness from 10 μm to 500 μm, particularly preferably from 30 μm to 300 μm. Busbars made of electrically conductive foils with these thicknesses are technically simple to realize and have an advantageous current load capacity. The strip can be electrically conductively connected to the electrically conductive coating, for example, via a soldering compound, via an electrically conductive adhesive, or an electrically conductive adhesive strip or by direct application. Busbars made of strips of a conductive foil are particularly suitable in particular if the electrically conductive coating is arranged on a layer of the intermediate layer. To improve the conducting connection, a silver-containing paste, for example, can be arranged between a conductive coating and busbars.

The length of the busbars depends on the design of the electrically conductive coating, in particular on the number and width of the segments to be contacted, and can be appropriately selected in the individual case by the person skilled in the art. The term "length" of the typical strip-type busbar means its longer dimension, along which is customarily contacted with the various segments of the coating.

The heating power can be influenced with a given applied voltage U (specified as a rule by the vehicle manufacturer) and sheet resistance $R_S$ and length of the busbars by the width of the busbars. Usually, good results are obtained in a range for the width of the busbars from 1 mm to 10 mm, preferably from 2 mm to 5 mm.

The connection elements are implemented, in one embodiment, as a printed and fired conductive structure, where the materials and layer thicknesses described above in conjunction with the busbars apply in the same manner for the connection elements as well. The connection elements are implemented, in another embodiment, as strips of an electrically conductive foil, where the materials and layer thicknesses described above in conjunction with the busbars apply in the same manner for the connection elements as well. Preferably, the busbars and the connection elements are made from the same material, which is advantageous for simple and economical production of the pane.

The busbars and the connection elements can also be formed by a combination of a printed and fired conductive structure and a strip of an electrically conductive foil. The busbars or connection elements then include a printed conductive structure with a strip of an electrically conductive foil applied thereon. Such busbars or connection elements are particularly suitable when the electrically conductive coating is arranged on a layer of the intermediate layer.

The connection elements are arranged completely between the outer pane and the inner pane. The connection elements are thus laminated into the side pane according to the invention. In particular, the connection elements are not cables that extend beyond the edge of the pane.

The length of the connection elements is governed by the number, width, and mutual distance between the segments of the coating that are to be connected to each other via the connection elements. Accordingly, the length is selected appropriately by the person skilled in the art. The length of the contact region between the connection element and each of the segments contacted thereby is preferably from 50% to 100%, particularly preferably from 80% to 99% of the width of the segment.

The width of the connection elements is preferably from 1 mm to 10 mm, particularly preferably from 2 mm to 5 mm. The width of the connection elements can be selected equal to the width of the busbars.

In the context of the invention, an "isolating line" means a linear region within the electrically conductive coating, which is not electrically conductive. The isolating line preferably extends over the entire thickness of the electrically conductive coating, but at least over the entire thickness of the electrically conductive layer(s) of the coating. The isolating line is preferably introduced into the electrically conductive coating by means of a laser and created by laser-induced induced degeneration within the electrically conductive coating. Such laser-induced degeneration is, for example, ablation of the electrically conductive layer or a chemical change in the electrically conductive layer. By means of the laser-induced degeneration, an interruption of the electrical conductivity of the layer is obtained. However, the isolating line can, in principle, also be implemented by other methods, for example, mechanical abrasion.

The line width of the isolating line according to the invention is preferably less than or equal to 500 µm. Particularly preferably, the line width is from 10 µm to 250 µm, most particularly preferably from 20 µm to 150 µm. In this range for the line width, particularly good results are obtained. On the one hand, the electrically nonconductive line is wide enough to result in effective interruption of the electrically conductive layer. On the other, the line width is advantageously low in order to be only slightly visible to an observer.

If the pane has more than one heating strip that consists of at least two serially connected segments of the coating, it is usually necessary or desirable for the connection elements of the various heating strips to be arranged one over another. "Connection elements arranged one over another" means connection elements that are a different distance from the side edge of the pane along which they extend, whose projections, however, overlap on this side edge. The segments of a heating strip may, of course, only be in electrically conductive contact with the connection element associated with this heating strip and not with the connection elements of the other heating strips.

Connection elements, which traverse segments with which they are not intended to be in contact can be separated from the segments by an isolating material. The isolating material is preferably an electrically nonconductive film that is arranged between the segments of the coating and the connection element. The isolating film preferably contains a polyimide (PI) and/or polyisobutylene (PIB) and preferably has a thickness from 10 µm to 200 µm, preferably from 50 µm to 100 µm. Particularly good results are thus obtained.

Alternatively, by means of suitably arranged isolating lines, the segments can be implemented such that they do not extend into the region of those connection elements with which they are not intended to be brought into contact. The regions of the segments of a heating strip provided for contacting with the connection element are then arranged immediately adjacent one another.

The outer pane and/or the inner pane preferably contain glass, particularly preferably flat glass, float glass, quartz glass, borosilicate glass, soda lime glass, or plastics, preferably rigid plastics, in particular polyethylene, polypropylene, polycarbonate, polym ethyl methacrylate, polystyrene, polyamide, polyester, polyvinyl chloride, and/or mixtures thereof.

The thickness of the panes can vary widely and thus be eminently adapted to the requirements of the individual case. Preferably, the thicknesses of the outer pane and of the interpane are from 0.5 mm to 10 mm and preferably from 1 mm to 5 mm, most particularly preferably from 1.4 mm to 3 mm.

The outer pane, the inner pane, or the intermediate layer can be clear and colorless, but also tinted, clouded or colored. The outer pane and the inner pane can be made of non-prestressed, partially prestressed, or prestressed glass.

The intermediate layer is formed by at least one thermoplastic connection film. The thermoplastic connection film includes at least one thermoplastic polymer, preferably ethylene vinyl acetate (EVA), polyvinyl butyral (PVB), or polyurethane (PU) or mixtures or copolymers or derivatives thereof, particularly preferably polyvinyl butyral. The thickness of the thermoplastic connection film is preferably from 0.2 mm to 2 mm, particularly preferably from 0.3 mm to 1 mm, for example, 0.38 mm or 0.76 mm.

When the electrically conductive coating is applied on the surface of the outer pane or of the inner pane, the intermediate layer can, in one embodiment of the invention, be formed by precisely one thermoplastic connection film. This is advantageous with regard to low thickness and simple production of the pane. The intermediate layer can, however, also be constructed from multiple layers, for example, to improve the acoustic properties of the pane.

When the electrically conductive coating is applied on a carrier film (carrier layer), the intermediate layer preferably includes, in the order specified, a first thermoplastic film, the coated carrier film, and a second thermoplastic film.

The carrier film preferably includes at least polyethylene terephthalate (PET), polyethylene (PE), or mixtures or copolymers or derivatives thereof. This is particularly advantageous for the handling, stability, and optical properties of the carrier film. The carrier film preferably has a thickness from 5 µm to 500 µm, particularly preferably from 10 µm to 200 µm, and most particularly preferably from 12 µm to 75 µm. Carrier layers with these thicknesses can be advantageously prepared in the form of flexible and simultaneously stable films that can be readily handled.

The invention further comprises a method for producing a heatable laminated side pane, comprising at least (a) Preparation of an outer pane, an inner pane, and an intermediate layer, wherein the outer pane, the inner pane, or a film of the intermediate layer are [sic] provided with an electrically conductive coating, (b) Introduction of isolation lines into the electrically conductive coating, wherein the electrically conductive coating is divided into strip-shaped segments, (c) A first busbar and a second busbar and electrically conductive connection elements are brought into contact with the electrically conductive coating such that heating strips are formed running between the first busbar and the second busbar and each containing at least one segment, wherein at least one heating strip is formed by at least two segments, which are electrically conductively connected to each other via at least one electrically conductive connection element, and the length of each individual heating strip deviates by at most 10% from the average length of the heating strips, and (d) the outer pane is bonded to the inner pane via the intermediate layer by lamination.

The intermediate layer is prepared in the form of at least one film.

The introduction of the isolation lines is done, as described above, preferably by laser processing, but can also, in principle, be done with other methods.

The application of the connection elements and busbars can, in particular, be done by placement, printing, soldering, or gluing.

The production of the composite glass by lamination is done with customary methods known per se to the person skilled in the art, for example, autoclave methods, vacuum bag methods, vacuum ring methods, calender methods, vacuum laminators, or combinations thereof. The bonding of the outer pane and the interpane is customarily done under the action of heat, vacuum, and/or pressure.

The side pane according to the invention is preferably used in means of locomotion for travel on land, in the air, or on water, in particular in motor vehicles.

In the following, the invention is explained in detail with reference to drawings and exemplary embodiments. The drawings are a schematic depiction and not true to scale. The drawings in no way restrict the invention.

Figure 2:
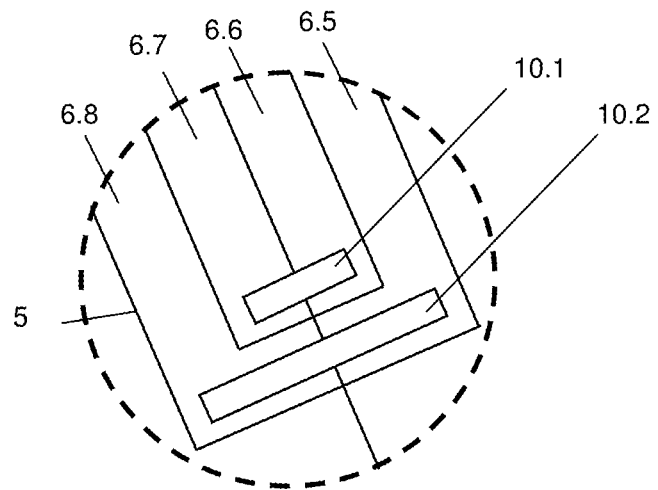
Figure 3:
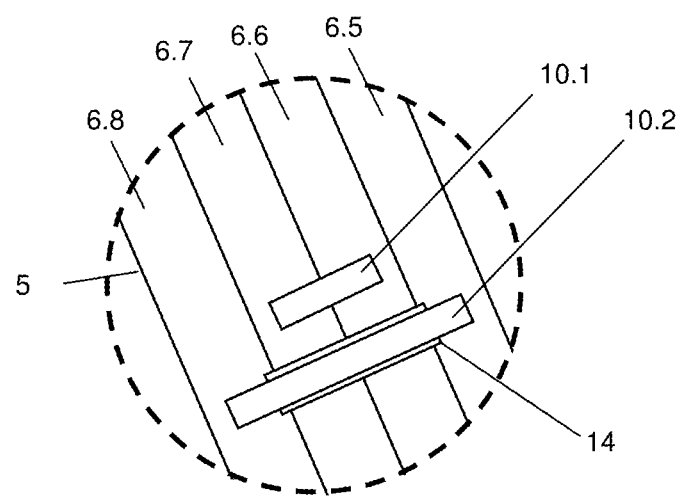
Figure 4:
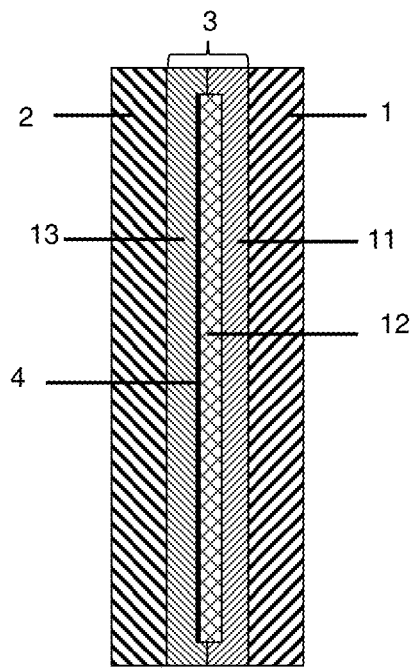
Figure 5:
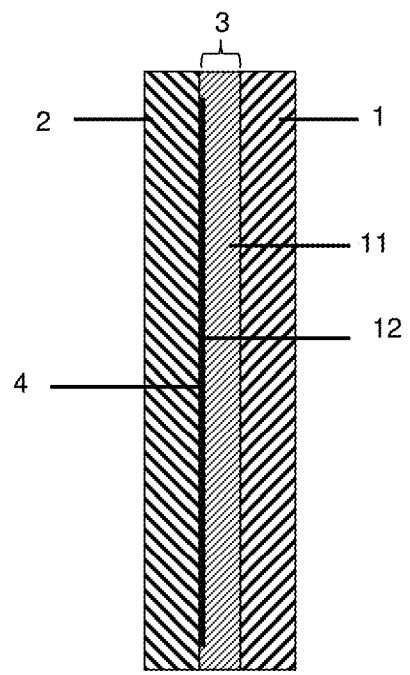
Figure 6:
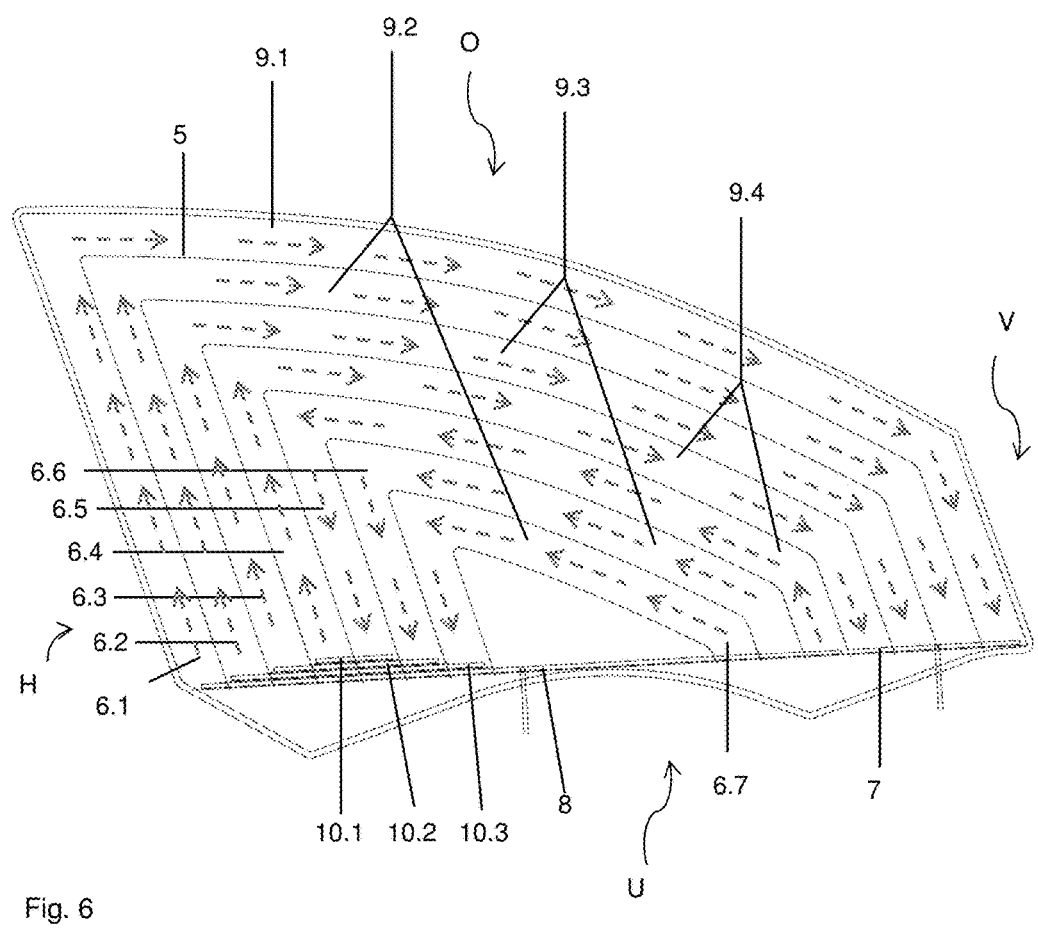
Figure 7:
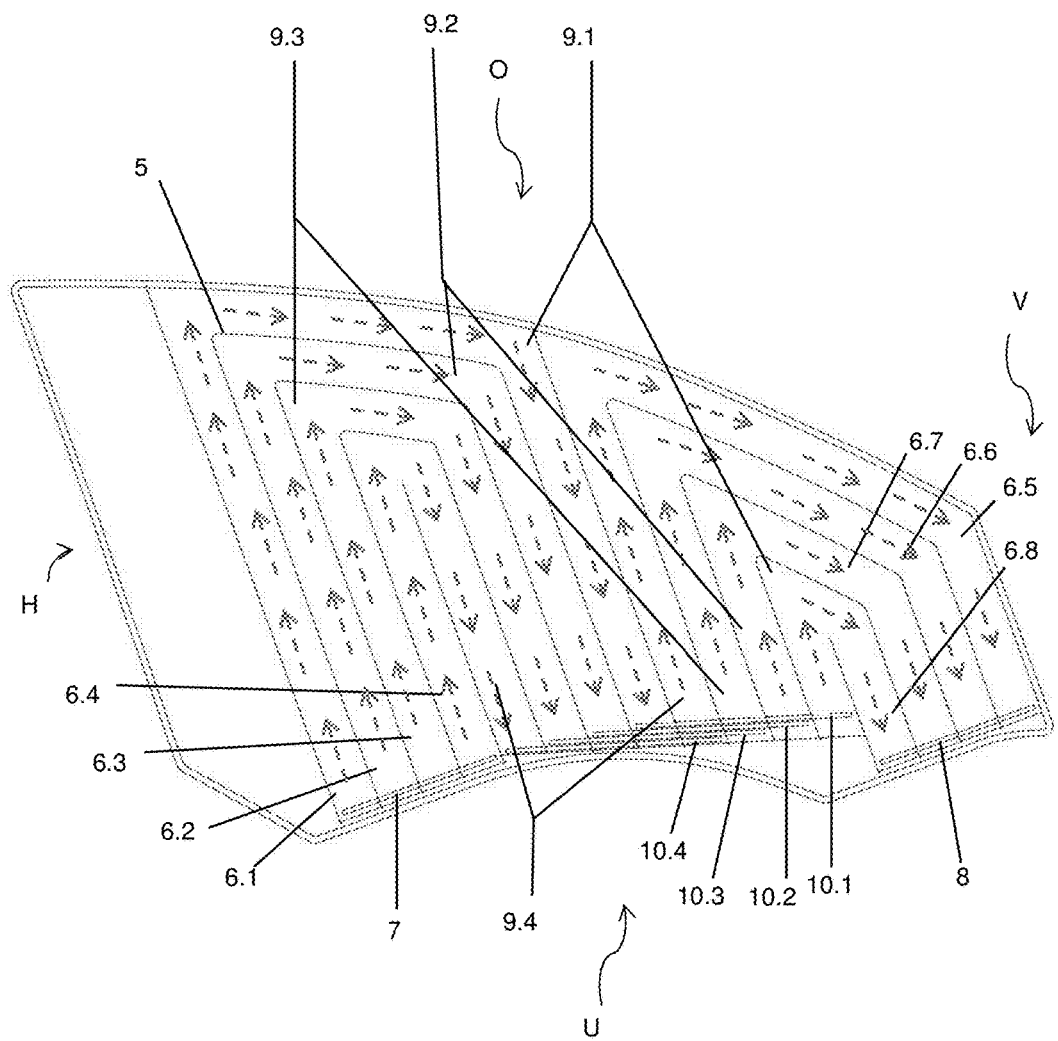
Figure 8:
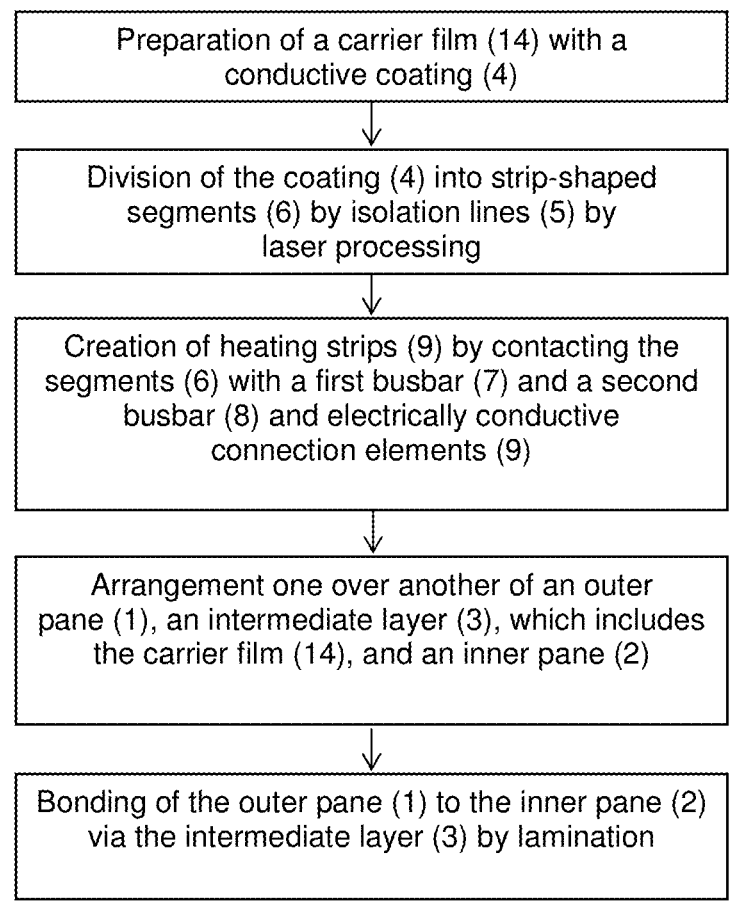

They depict:

FIG. 1 a plan view of an embodiment of the side pane according to the invention, FIG. 2 an enlarged detail of the region around the electrically conductive connection elements in an embodiment of the side pane according to the invention, FIG. 3 an enlarged detail of the region around the electrically conductive connection elements in another embodiment of the side pane according to the invention, FIG. 4 a cross-section through an embodiment of the side pane according to the invention, FIG. 5 a cross-section through another embodiment of the side pane according to the invention, FIG. 6 a plan view of another embodiment of the side pane according to the invention, FIG. 7 a plan view of another embodiment of the side pane according to the invention, and FIG. 8 a flowchart of an embodiment of the method according to the invention.

FIG. 1 depicts a plan view of an embodiment of the heatable laminated side pane according to the invention. The side pane is a composite glass made of an outer pane, an inner pane, and an intermediate layer that bonds the two panes to each other. An electrically conductive coating 4 is arranged between the outer pane and the inner pane. The electrically conductive coating 4 is contacted with a first busbar 7 and a second busbar 8. When a voltage is applied on the busbars 7, 8, a current flows through the electrically conductive coating 4, creating the heating action. The side pane is intended for the window of a passenger car that can be opened by lowering the side pane.

Due to the complex shape of the side pane, it is impossible to arrange the busbars 7, 8 parallel to each other on opposite edges. The nonparallel arrangement would result, with a conventional coating 4, in greatly reduced homogeneity of the current flow between the busbars 7, 8 and, thus, of the heating action. The object of the invention is to improve the homogeneity of the temperature distribution in this case.

To this end, the coating 4 is divided into ten segments 6 by isolation lines 5. The segments 6 are completely isolated from each other electrically by the isolation lines 5. The propagation direction of the current paths between the busbars 7, 8 is determined by the segments 6 and the current is guided uniformly over the surface of the pane such that the most full-surface heating action possible is obtained.

The isolation lines 5 run from the rear edge H of the pane roughly parallel to the upper edge O and front edge V all the way to the lower edge U, with the isolation lines 5 arranged equidistant with a consistent distance between them of 4 cm, which corresponds to the width of the segments 6.

The segments 6 have, however, a different length due to the complex shape of the pane. If each segment 6 were contacted with the two busbars 7, 8, a current path would form in each segment, respectively. Since the temperature to which the coating 4 is heated is a function of the length of the segment 6, the current would, indeed, be guided over the entire pane, but the temperature and, thus, the heating action would be highly inhomogeneous.

In order to produce current paths with equal or at least very similar length, some of the segments 6 are serially connected to each other in pairs by connection elements, with the first segment contacted on one end to the first busbar 7 and the second segment contacted with the second busbar 8 on its opposite end. The current thus flows first along the first segment and then along the second segment. One segment that is connected to the two busbars 7, 8, or a group of segments serially connected to each other that is connected to the two busbars 7, 8 is referred to in the context of the invention as a heating strip.

The busbars 7, 8 and the connection elements 10 are, for example, implemented as strips of a copper foil with a thickness of 50 µm and a width of 4 mm and are, for example, applied on the coating 4 with a 50-µm-thick electrically conductive adhesive strip.

The first busbar 7 runs roughly along the upper half of the rear edge H of the pane and is connected to the segments 6.1, 6.2, 6.3, 6.4, and 6.5. If the coating 4 is applied, for example, on a carrier film of the intermediate layer, this contacting can be realized in that the busbar runs on the coated surface in the region in which it is to be contacted with the coating 4, is then guided through a passage in the carrier film, and continues to run on the opposite surface of the carrier film, in order then, for example, to be connected on the lower edge U of the pane to an external power source. The second busbar 8 runs roughly along the lower half of the rear edge H of the pane and along roughly the entire lower edge U. On the rear edge H, the second busbar 8 is connected to the segments 6.6, 6.7, 6.8, 6.9, and 6.10. On the lower edge U, the second busbar 8 is connected only to the segments 6.1 and 6.2.

The segment 6.3 is connected to the segment 6.10 via the electrically conductive connection element 10.4. The segment 6.4 is connected to the segment 6.9 via the electrically conductive connection element 10.3. The segment 6.5 is connected to the segment 6.8 via the electrically conductive connection element 10.2. The segment 6.6 is connected to the segment 6.7 via the electrically conductive connection element 10.1.

The busbars 7, 8 and the connection elements 10 are arranged along the rear edge H and/or the lower edge U of the pane. The distance from the rear edge is less than 1 cm; the distance from the lower edge is less than 3 cm. When the side pane is lowered to open the window, these elements remain advantageously concealed behind the body of the vehicle door. The upper edge O and the front edge V, which are visible in the opened state, remain advantageously free of the busbars 7, 8 and the connection elements 10.

In the embodiment depicted, the segment 6.1 forms the heating strip 9.1 and the segment 6.2 forms the heating strip 9.2. The segments 6.3 and 6.10 form together the heating strip 9.3. The segments 6.4 and 6.9 form together the heating strip 9.4. The segments 6.5 and 6.8 form together the heating strip 9.5. The segments 6.6 and 6.7 form together the heating strip 9.6. The course of the current paths between the busbars 7,8 along the heating strips 9 is indicated in the figure by dashed arrows.

The length of the heating paths 9 of an exemplary embodiment is summarized in Table 1. The arithmetic mean of the length of all heating paths 9 is 1128 mm. The maximum deviation of the length of a heating path from this mean is 12.5%. As a result of the very similar length of all heating paths 9, they are heated by the current flow to a very similar temperature. This is the major advantage of the invention.

TABLE 1

| Heating Path | Length of the Heating Path/mm | Deviation from the Mean/ | |
|---|---|---|---|
| | | mm | % |
| 9.1 | 1063 | 65 | 5.8% |
| 9.2 | 999 | 129 | 11.4% |
| 9.3 | 1226 | 98 | 8.7% |
| 9.4 | 987 | 141 | 12.5% |
| 9.5 | 1264 | 136 | 12.1% |
| 9.6 | 1229 | 101 | 9.0% |

The embodiments and values indicated here are understood as exemplary embodiments and are not intended to limit the invention. The person skilled in the art has great design freedom in the design of the segments 6 and their connection to form the heating strips 9. It is possible to further reduce the deviations of length from the mean by means of appropriate selection of the segments and their connection.

In another exemplary embodiment with a geometric design of the ten segments 6 similar to that in FIG. 1, where, in each case, two of the segments 6 (6.1 and 6.10; 6.2 and 6.9; 6.3 and 6.8; 6.4 and 6.7; 6.5 and 6.6) were connected to form a total of five heating strips 9, the length distribution from Table 1 a was observed. The arithmetic mean of the length of all heating paths 9 is 1397 mm. the maximum deviation of the length of a heating path from this mean is only 2.1%.

TABLE 1a

| Heating Path | Length of the Heating Path/mm | Deviation from the Mean/ | |
|---|---|---|---|
| | | mm | % |
| 9.1 | 1367 | 30 | 2.1% |
| 9.2 | 1391 | 6 | 0.4% |
| 9.3 | 1408 | 11 | 0.8% |
| 9.4 | 1415 | 18 | 1.3% |
| 9.5 | 1404 | 7 | 0.5% |

FIG. 2 and FIG. 3 depict detailed views of the connection of various segments 6 by means of the connection elements 10. The figures depict alternative solutions to ensure that each connection element 10 is in conductive contact only with those segments 6 that are intended to be connected by this connection element 10 to form one heating strip 9. The electrically conductive coating 4 with the segments 6 and the connection elements 10 is implemented as depicted in FIG. 1. The depictions are intended to illustrate the principle of the serial connection of the segments 6 and are also accordingly transferable to other configurations of the electrically conductive coating 4.

In FIG. 2, the segments 6 are configured through the appropriate arrangement of the isolation lines 5 such that the two respective segments that are to be serially connected are arranged immediately adjacent each other in the region of the connection. In principle, it is, for example, conceivable that the two segments as a whole are arranged immediately adjacent each other, by which means their end regions, in which the serial connection occurs, are also mandatorily arranged immediately adjacent each other. In the embodiment depicted, the coating 4 is divided into embracing segment pairs. The first segment pair consists of the segments 6.6 and 6.7, which are arranged as a whole immediately adjacent each other and are serially connected in the end region by the connection element 10.1. The second segment pair consists of the segments 6.5 and 6.8, which are serially connected in the end region by the connection element 10.2, and embrace the first segment pair. This means that one segment each of the second segment pair is immediately adjacent one segment each of the first segment pair. The first segment pair is implemented somewhat shorter than the second segment pair such that it does not extend all the way into the region of the second electrically conductive connection element 10.2. Consequently, the segments 6.5 and 6.8 have an end region that protrudes beyond the first segment pair, and in which the segments 6.5 and 6.8 are immediately adjacent each other. The connection element 10.2 is arranged in this end region. The following segment pair analogously embraces the second segment pair and so on.

In FIG. 3, the connection element 10.2, which connects the second segment pair 6.5,6.8, has to bridge the first segment pair 6.6, 6.7, because the first segment pair, in contrast to FIG. 2, extends all the way into the region of the second connection element 10.2. This situation is present, for example, when all isolation lines 5 extend all the way to the side edge of the pane. In order to prevent electrical contact between the connection element 10.2 and the segments 6.6 and 6.7, a strip of an insulating film 14, for example, a polyimide tape (Kapton®), is arranged between these segments 6.6 and 6.7 and the connection element 10.2.

In particular, the second variant, depicted in FIG. 3, is very flexibly usable whenever a connection element runs over one or more segments to which it is not supposed to be electrically conductively connected.

FIG. 4 and FIG. 5 depict, by way of example, different possibilities for the arrangement of the electrically conductive coating 4 in the laminated side pane. The figures depict cross-sections of two embodiments of the composite glass made up of the outer pane 1 and the inner pane 2, which are connected to each other via an intermediate layer 3. The outer pane and the inner pane are made of soda lime glass and have in each case a thickness of 2.1 mm.

In FIG. 4, the intermediate layer 3 comprises a first connection film 11 and a second connection film 13, between which a carrier film 12 is introduced. The connection films 11, 13 are made of polyvinyl butyral (PVB) and have, in each case, a thickness of 0.76 mm. The carrier film 12 is made of polyethylene terephthalate (PET) and has a thickness of 75 µm. The carrier film 12 is provided with the electrically conductive coating 4. The coating 4 is a layer stack, which includes, for example, two electrically conductive layers made of silver and some dielectric layers. Such coated carrier films are commercially available. Usually, the sheet resistances of the layers are between 1 $\Omega$/square and 10 $\Omega$/square, for example, 2.5 $\Omega$/square or 4.5 $\Omega$/square. Coatings with such sheet resistances are of interest, in particular, for electric vehicles, because, with the onboard voltages customary there of roughly 42 V, an advantageous heating power, in particular greater than or equal to 350 W/m², can be obtained.

The carrier film 12 has a cut-back relative to the surface of the composite glass and does not extend all the way to the side edge of the composite glass, but has a circumferential distance from the side edge of, for example, 10 mm. Consequently, the coating 4 is advantageously protected in the interior of the intermediate layer 4 against corrosion.

In FIG. 5, the intermediate layer comprises a single connection film 11, which is, for example, made of PVB and has a thickness of 0.76 mm. The electrically conductive coating 4 is applied on the surface of the inner pane 2 facing the thermoplastic intermediate layer 3. The electrically conductive layer 4 is, again, typically a layer stack with, for example, two or three layers; with such coatings sheet resistances less than 1 $\Omega$/square can be obtained, which provides a high heating power even with a voltage of only roughly 14 V, which corresponds to the onboard voltage of conventional passenger cars. The inner pane 2 has a circumferential edge region with a width of, for example, 2 mm, which is not provided with the coating 4. The coating 4 thus has no contact with the surrounding atmosphere and is advantageously protected in the interior of the intermediate layer 4 against corrosion. The coating 4 could also be applied on the surface of the outer pane 1 facing the intermediate layer 3.

FIG. 6 depicts an alternative embodiment of the heating paths 9. The isolation lines 5 run from the lower edge U in the rear half of the pane roughly parallel to the rear edge H, then upper edge O, and then front edge V all the way to the lower edge U in the front half of the pane. The width of the segments 6 is 4 cm.

The first busbar 7 runs roughly along the lower edge U in the front region of the pane and is connected to the segments 6.1, 6.2, 6.3, and 6.4. The second busbar 8 begins just behind the first busbar 8 in the region of the segment 6.5 and runs along the lower edge U of the pane almost to the rear edge H. The segments 6.5, 6.6, and 6.7 are contacted by the second busbar 8 in the front half of the pane and the segment 6.1 at the rear end of the pane.

The segment 6.1 forms the heating strip 9.1. The segment 6.2 is connected to the segment 6.7 via the electrically conductive connection element 10.3 to form the heating strip 9.2. The segment 6.3 is connected to the segment 6.6 via the electrically conductive connection element 10.2 to form the heating strip 9.3. The segment 6.4 is connected to the segment 6.5 via the electrically conductive connection element 10.1 to form the heating strip 9.4. The busbars 7, 8 and the connection elements 10 are arranged along the lower edge U of the pane and remain advantageously concealed behind the body of the vehicle door.

The length of the heating paths 9 of an exemplary embodiment is summarized in Table 2. The arithmetic mean of the length of all heating paths 9 is 1731 mm. The maximum deviation of the length of a heating path from this mean is 13.2%.

TABLE 2

| Heating Path | Length of the Heating Path/mm | Deviation from the Mean/ | |
|---|---|---|---|
| | | mm | % |
| 9.1 | 1503 | 228 | 13.2% |
| 9.2 | 1809 | 78 | 4.5% |
| 9.3 | 1809 | 78 | 4.5% |
| 9.4 | 1803 | 72 | 4.2% |

FIG. 7 depicts an alternative embodiment of the heating paths 9, which clearly deviates from the aforementioned exemplary embodiments. The segments 6 are not all arranged parallel to each other, but are divided into two groups. The segments 6.1, 6.2, 6.3, and 6.4 of the first group cover a rear region of the pane, in which they run loop-like and parallel to each other from a rear section of the lower edge U to a front section of the lower edge. The segments 6.5, 6.6, 6.7, and 6.8 of the two groups correspondingly cover a front region of the pane. The width of the segments 6 is 4 cm.

The busbars (7, 8) are again arranged in the region of the lower edge U. The first busbar 7 contacts the segments 6 of the first group in the rear section of the lower edge U. The second busbar 8 contacts the segments 6 of the second group in the front section of the lower edge U.

A respective segment 6 of the first group is connected to a respective segment 6 of the second group via a connection element 10, with the longest segment 6.1 of the first group being connected to the shortest segment 6.8 of the second group, the second longest segment 6.2 of the first group being connected to the second longest segment 6.7 of the second group and so on.

The segments 6.1 and 6.8 are connected via the electrically conductive connection element 10.1 to form the heating strip 9.1. The segments 6.2 and 6.7 are connected via the electrically conductive connection element 10.2 to form the heating strip 9.2. The segments 6.3 and 6.6 are connected via the electrically conductive connection element 10.3 to form the heating strip 9.3. The segments 6.4 and 6.5 are connected via the electrically conductive connection element 10.4 to form the heating strip 9.4.

The length of the heating paths 9 of an exemplary embodiment is summarized in Table 3. The arithmetic mean of the length of all heating paths 9 is 1509 mm. The maximum deviation of the length of a heating path from this mean is 3.4%.

TABLE 3

| Heating Path | Length of the Heating Path/mm | Deviation from the Mean/ mm | % |
|---|---|---|---|
| 9.1 | 1457 | 52 | 3.4% |
| 9.2 | 1500 | 9 | 0.6% |
| 9.3 | 1531 | 22 | 1.5% |
| 9.4 | 1547 | 38 | 2.5% |

FIG. 8 depicts a flowchart of an exemplary embodiment of the method according to the invention for producing a laminated heatable side pane according to the invention.

LIST OF REFERENCE CHARACTERS (1) outer pane
(2) inner pane
(3) intermediate layer
(4) electrically conductive coating
(5) isolating line
(6), (6.x) segment of the coating 4
(7) first busbar
(8) second busbar
(9), (9.x) heating strip
(10), (10.x) electrically conductive connection element
(11) connection film
(12) carrier film
(13) second connection film
(14) insulating film
H rear edge of the side pane
O upper edge of the side pane
V front edge of the side pane
U lower edge of the side pane

The invention claimed is:

1. A heatable laminated side pane, comprising:
an outer pane;
an inner pane;
a thermoplastic intermediate layer connecting the outer pane and the inner pane;
a transparent electrically conductive coating arranged in a planar manner between the outer pane and the inner pane, the transparent electrically conductive coating being divided by isolation lines into segments,
wherein the transparent electrically conductive coating includes a plurality of heating strips running between a first busbar and a second busbar, each heating strip having a length,
wherein each heating strip contains at least one segment,
wherein each heating strip is electrically insulated from each other heating strip,
wherein at least one heating strip is formed by at least two segments that are electrically conductively serially connected to each other via at least one electrically conductive connection element, wherein the at least one electrically conductive connection element is directly connected to the at least two segments, wherein the at least one electrically conductive connection element is laminated into the side pane,
wherein the length of each heating strip deviates by at most 15% from an average length of the plurality of heating strips, and
wherein the connection elements, the first busbar and the second busbar are formed as strips of an electrically conductive foil or as fired screen printing paste wherein the regions of the segments of all heating strips provided for contacting with the connection element are arranged immediately adjacent each other.

2. The heatable laminated side pane according to claim 1, wherein each heating strip is formed by one or two segments.

3. The heatable laminated side pane according to claim 1, wherein each heating strip is formed by five to fifteen segments.

4. The heatable laminated side pane according to claim 1, wherein the length of each individual heating strip deviates by at most 10% from the average length of the heating strips.

5. The heatable laminated side pane according to claim 1, wherein the length of each individual heating strip deviates by at most 5% from the average length of the heating strips.

6. The heatable laminated side pane according to claim 1, wherein the width of the heating strips is from 1 cm to 10 cm.

7. The heatable laminated side pane according to claim 6, wherein all heating strips have the same width.

8. The heatable laminated side pane according to claim 1, wherein the width of the heating strips is from 2 cm to 6 cm.

9. The heatable laminated side pane according to claim 8, wherein all heating strips have the same width.

10. The heatable laminated side pane according to claim 1, wherein regions of the segments of a heating strip are provided for contacting with the connection element and each region of the segment provided for contacting with the connection element is arranged immediately adjacent each other region of the segment provided for contacting with the connection element.

11. The heatable laminated side pane according to claim 1, wherein an insulating film is arranged between a connection element and segments to which the connection element is not supposed to be connected, wherein the insulating film contains at least one of polyimide (PI) and polyisobutylene (PIB), and wherein the insulating film has a thickness from 10 μm to 200 μm.

12. The heatable laminated side pane according to claim 1, wherein the line width of the isolation lines is less than or equal to 500 μm.

13. The heatable laminated side pane according to claim 1, wherein the line width of the isolation lines is from 10 μm to 250 μm.

14. The heatable laminated side pane according to claim 1, wherein the line width of the isolation lines is from 20 μm to 150 μm.

15. The heatable laminated side pane according to claim 1, wherein the electrically conductive foil contains copper or the fired screen printing paste contains silver particles.

16. The heatable laminated side pane according to claim 1, wherein each connection element has a width from 1 mm to 10 mm and wherein the length of the contact region between the connection element and each of the segments contacted by the connection element is from 50% to 100% of the width of the segment.

17. The heatable laminated side pane according to claim 1, wherein each connection element has a width from 1 mm to 10 mm and wherein the length of the contact region between the connection element and each of the segments contacted by the connection element is from 80% to 99% of the width of the segment.

18. The heatable laminated side pane according to claim 1, wherein the connection elements, the first busbar and the second busbar are arranged along at least one of a lower edge and a rear edge of the heatable laminated side pane, being arranged at a distance from the lower edge less than 10 cm, and being arranged at a distance from the rear edge less than 3 cm.

19. The heatable laminated side pane according to claim 1, wherein the electrically conductive coating is applied on the outer pane, on the inner pane, or on a carrier film in the intermediate layer, and includes at least one electrically conductive layer, which contains at least silver and has a thickness from 10 nm to 50 nm.

20. The heatable laminated side pane according to claim 19, wherein the electrically conductive coating includes two or three electrically conductive layers.

21. The heatable laminated side pane according to claim 1, wherein a heating power PS is at least 250 W/m$^2$.

22. A method for producing a heatable laminated side pane, comprising:
preparing an outer pane, an inner pane, and an intermediate layer, wherein the outer pane, the inner pane, or a film of the intermediate layer are provided with an electrically conductive coating;
introducing isolation lines into the electrically conductive coating, wherein the electrically conductive coating is divided into strip-shaped segments;
contacting a first busbar and a second busbar and electrically conductive connection elements with the electrically conductive coating such that a plurality of heating strips are formed running between the first busbar and the second busbar and each heating strip contains at least one segment,
 wherein the connection elements and the first busbar and the second busbar are formed as strips of an electrically conductive foil or as fired screen printing paste,
 wherein at least one heating strip is formed by at least two segments, which are electrically conductively serially connected to each other via at least one electrically conductive connection element, wherein the at least one electrically conductive connection element is directly connected to the at least two segments, wherein the at least one electrically conductive connection element is laminated into the side pane, and,
 wherein a length of each individual heating strip deviates by at most 10% from an average length of the plurality of heating strips; and
bonding the outer pane to the inner pane via the intermediate layer by lamination wherein the regions of the segments of all heating strips provided for contacting with the connection element are arranged immediately adjacent each other.

23. The method according to claim 22, wherein introducing the isolation lines into the electrically conductive coating includes laser machining.

24. A method of using of a heatable laminated side pane, comprising;
providing a heatable laminated side pane including
an outer pane,
an inner pane,
a thermoplastic intermediate layer connecting the outer pane and the inner pane,
a transparent electrically conductive coating arranged in a planar manner between the outer pane and the inner pane, the transparent electrically conductive coating being divided by isolation lines into segments,
 wherein the transparent electrically conductive coating includes a plurality of heating strips running between a first busbar and a second busbar, each heating strip having a length,
 wherein each heating strip contains at least one segment,
 wherein each heating strip is electrically insulated from each other heating strip,
 wherein at least one heating strip is formed by at least two segments that are electrically conductively serially connected to each other via at least one electrically conductive connection element, wherein the at least one electrically conductive connection element is directly connected to the at least two segments, wherein the at least one electrically conductive connection element is laminated into the side pane,
 wherein the length of each heating strip deviates by at most 15% from an average length of the plurality of heating strips,
 wherein the connection elements, the first busbar and the second busbar are formed as strips of an electrically conductive foil or as fired screen printing paste; and
using the heatable laminated side pane in means of locomotion for travel on land,
in the air, or on water wherein the regions of the segments of all heating strips provided for contacting with the connection element are arranged immediately adjacent each other.

25. The method according to claim 24, wherein using the heatable laminated side pane in means of locomotion for travel on land includes using the heatable laminated side pane in motor vehicles.

26. A heatable laminated side pane, comprising: an outer pane;
an inner pane;
a thermoplastic intermediate layer connecting the outer pane and the inner pane;
a transparent electrically conductive coating arranged in a planar manner between the outer pane and the inner pane, the transparent electrically conductive coating being divided by isolation lines into segments,
 wherein the transparent electrically conductive coating includes a plurality of heating strips running between a first busbar and a second busbar, each heating strip having a length,
 wherein each heating strip contains at least one segment,
 wherein each heating strip is electrically insulated from each other heating strip, wherein at least one heating strip is formed by at least two segments that are electrically conductively serially connected to each other via at least one electrically conductive connection element wherein the at least one electrically conductive connection element is directly connected to the at least two segments, wherein the at least one electrically conductive connection element is laminated into the side pane, and,
 wherein first and second ends of the at least one electrically conductive connection element are directly connected to, and surrounded by, the transparent electrically conductive coating of a respective one of the at least two segments, wherein the at least one electrically conductive connection element is laminated into the heatable laminated side pane, wherein the length of each heating strip deviates by at most 15% from an average length of the plurality of heating strips, and wherein the connection elements, the first busbar and the second busbar are formed as strips of an electrically conductive foil or as fired screen printing paste wherein the regions of the segments of all heating strips provided for contacting with the connection element are arranged immediately adjacent each other.

* * * * *